United States Patent
Davis (10) Patent No.: US 6,199,340 B1
(45) Date of Patent: *Mar. 13, 2001

(54) MODULAR CONSTRUCTION ELEMENT

(75) Inventor: Harry H. Davis, Mooresville, NC (US)

(73) Assignee: L.B. Plastics Limited, Derby (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/152,721

(22) Filed: Sep. 14, 1998

Related U.S. Application Data (63) Continuation-in-part of application No. 08/798,828, filed on Feb. 12, 1997, now Pat. No. 5,819,491, which is a continuation-in-part of application No. 08/589,728, filed on Jan. 22, 1996, now Pat. No. 5,647,184.

(51) Int. Cl.$^7$ .................................. E04C 3/00; E04B 5/00
(52) U.S. Cl. ..................... 52/592.1; 52/588.1; 52/177; 52/650.3; 52/100; 52/731.3; 52/732.2
(58) Field of Search ................... 52/100, 588.1, 52/589.1, 592.1, 592.4, 591.1, 650.3, 730.4, 730.5, 731.2, 731.3, 732.1, 732.2, 539, 483.1

(56) References Cited

U.S. PATENT DOCUMENTS

| | | |
|---|---|---|
| Re. 31,368 | 9/1983 | Trumper . |
| 1,816,556 * | 7/1931 | White ................................ 52/539 X |
| 1,913,342 | 6/1933 | Schaffert . |
| 2,430,200 * | 11/1947 | Wilson ................................ 52/539 X |
| 3,043,407 | 7/1962 | Marryatt . |

(List continued on next page.)

FOREIGN PATENT DOCUMENTS

| | | |
|---|---|---|
| 665292 | 6/1965 | (BE) . |
| 0401422 | 1/1966 | (CH) . |
| 19 66 366 U | 8/1967 | (DE) . |
| 19 82 048 U | 3/1968 | (DE) . |
| 70 42 144 U | 11/1970 | (DE) . |

(List continued on next page.)

OTHER PUBLICATIONS

Heritage Marine, Classic Beauty Maintenance Free Durability, Submitted Pages, Published prior to Jan. 22, 1996, Macon, MS.

Brock Manufacturing, Maintenance–Free Savings. Enhanced Property Appearance., Submitted Pages, Published prior to Jan. 22, 1996, Milford, IN.

Mobil Chemical Company, Trex Wood–Polymer Composite—An Innovative Material From Mobil For Virtually Maintenance–Free Decking and Landscaping., Submitted Pages, Published prior to Jan. 22, 1996, Norwalk, CT.

Heritage Vinyl Products, Teck Deck—Vinyl . . . Is Final., Entire Brochure, Published prior to Jan. 22, 1996.

*Primary Examiner*—Robert Canfield
(74) *Attorney, Agent, or Firm*—Adams, Schwartz & Evans, P.A.

(57) ABSTRACT

An elongate modular decking plank is provided for assembly on a supporting subfloor together with a plurality of like planks to form a decking structure. The decking plank has a top wall spaced-apart from a bottom wall, and opposing laterally spaced downwardly converging side walls interconnecting the top and bottom walls. An integrally-formed flange extends outwardly from the bottom wall on one of said sides of the decoding plank. The flange includes a fastening portion for receiving fasteners therethrough to the supporting subfloor to mount the decking plank on the supporting subfloor, and a connecting portion for connecting the plank to an adjacent like plank in a manner which permits limited lateral and angular adjustment between adjacent planks. The plank is preferably extruded from high-impact polymeric material, such as PVC plastic.

12 Claims, 11 Drawing Sheets

U.S. PATENT DOCUMENTS

| | | |
|---|---|---|
| 3,100,556 | 8/1963 | De Ridder . |
| 3,385,182 * | 5/1968 | Harvey . |
| 3,432,147 | 3/1969 | Schreyer et al. . |
| 3,440,791 | 4/1969 | Troutner . |
| 3,555,762 | 1/1971 | Costanzo, Jr. . |
| 3,640,191 | 2/1972 | Hendrich . |
| 3,680,711 | 8/1972 | Brucker . |
| 3,707,819 | 1/1973 | Calhoun et al. . |
| 3,807,113 * | 4/1974 | Turner ................................ 52/539 X |
| 3,863,417 | 2/1975 | Franchi . |
| 3,914,913 | 10/1975 | Roberts . |
| 3,968,616 | 7/1976 | Gostling . |
| 4,231,206 * | 11/1980 | Hafner ................................ 52/539 X |
| 4,235,197 | 11/1980 | Curtis et al. . |
| 4,283,897 * | 8/1981 | Thompson ........................ 52/539 X |
| 4,892,052 | 1/1990 | Zook et al. . |
| 4,951,992 | 8/1990 | Hockney . |
| 5,048,448 | 9/1991 | Yoder . |
| 5,050,362 | 9/1991 | Tai et al. . |
| 5,052,159 | 10/1991 | Shvartsburd . |
| 5,088,910 | 2/1992 | Goforth et al. . |
| 5,159,788 | 11/1992 | Merrick . |
| 5,204,149 | 4/1993 | Phenicie et al. . |
| 5,274,977 | 1/1994 | Bayly . |
| 5,314,940 | 5/1994 | Stone . |
| 5,346,759 | 9/1994 | Will . |
| 5,351,458 | 10/1994 | Lehe . |
| 5,361,554 | 11/1994 | Bryan . |
| 5,411,782 * | 5/1995 | Jarvis et al. . |
| 5,647,184 * | 7/1997 | Davis ................................... 52/592.1 |
| 5,758,467 * | 6/1998 | Snear et al. ......................... 52/592.1 |
| 5,811,035 * | 9/1998 | Mockry ........................... 52/588.1 X |
| 5,819,491 * | 10/1998 | Davis ................................... 52/592.1 |

FOREIGN PATENT DOCUMENTS

| | | |
|---|---|---|
| 21 01 782 | 7/1972 | (DE) . |
| 2552622 | 5/1977 | (DE) . |
| 1524750 | 5/1967 | (FR) . |
| 1509652 | 1/1968 | (FR) . |
| 1524750 * | 3/1968 | (FR) . |
| 0834138 | 5/1960 | (GB) . |
| 1004439 | 9/1965 | (GB) . |
| 1080040 | 8/1967 | (GB) . |
| 2 015 068 | 9/1979 | (GB) . |
| 2015068 * | 9/1979 | (GB) ................................. 52/588.1 |
| 406264600 | 9/1949 | (JP) . |

* cited by examiner

MODULAR CONSTRUCTION ELEMENT

This application is a continuation-in-part of U.S. patent application Ser. No. 08/798,828 filed on Feb. 12, 1997, which is now U.S. Pat. No. 5,819,491 which is a CIP of Ser. No. 08/589,728 filed Jan. 22, 1996 now U.S. Pat. No. 2,647,184.

TECHNICAL FIELD AND BACKGROUND OF THE INVENTION

This invention relates to modular construction elements in the nature of planks and to structures formed from an assembly of such planks. The invention is applicable, for example, in the construction of boat docks, piers, decks, patios, walkways, pontoon boat floors, and the like.

According to one prior art plastic decking plank, separate cap and base elements are snapped together to form a single plank. The base element is first mounted directly to the subfloor width fasteners such as screws or nails. Mating components of the cap and base elements are then manually aligned, and a rubber hammer or other tool is used to snap-attach the pieces together. Unlike the invention, such two-piece designs generally require substantial time and effort to assemble. The present one-piece design results in a considerably stronger and more rigid deducing structure than a two-piece design while minimizing manufacturing and installation costs. In addition, due to the absence of engaging parts, the invention also produces less surface noise or squeaking than two-piece designs.

SUMMARY OF THE INVENTION

It is an object of the invention to provide a modular, one-piece plastic construction element which may be readily assembled together with a number of like elements to form a decking or other structure.

It is another object of the invention to provide a modular decking plank which includes complementary, integrally-formed male and female fastener components.

It is another object of the invention to provide a modular decking plank which is relatively inexpensive to manufacture.

It is another object of the invention to provide a decking plank which includes hidden fasteners located below the top surface of the decking structure for mounting the plank to a supporting subfloor.

According to the invention there is provided an elongate modular construction element for assembly with a plurality of like elements to form a structure, such as decking. The element is in the nature of a plank including spaced top and bottom walls interconnected by opposed side walls to define a void therein. First connecting means projects outwardly beyond one of first and second sides of the plank. Second connecting means, complementary to the first connecting means, is formed at the opposite side of the plank, whereby two such planks may be connected together in side by side relation. The connecting means is adapted to permit limited sliding movement of adjacent planks relative to one another in a direction transverse to the lengths of the planks, and limited angular movement about an axis extending parallel to the lengths thereof, whereby to permit the top walls of adjacent planks to be angularly inclined relative to one another to accommodate irregularities in a base or other supporting structure on or by which the resultant decking or other structure is supported.

Preferably, the connecting means are located adjacent the bottom wall of and extend continuously along the plank from one end thereof to the other. Preferably also, the first connecting means includes a laterally projecting flange having a fastening portion for receiving fasteners therethrough for attaching the plank to the supporting structure.

Preferably, the second connecting means includes a channel extending adjacent the bottom wall at the opposite side of the decking plank from the first connecting means for receiving a connecting portion of the flange.

The invention also provides a decking or other structure formed from a plurality of interconnected modular construction elements as previously described.

BRIEF DESCRIPTION OF THE DRAWINGS

An embodiment of the invention will now be described, by way of example only, with reference to the accompanying drawings, in which.

DESCRIPTION OF THE PREFERRED EMBODIMENT AND BEST MODE

Figure 1:
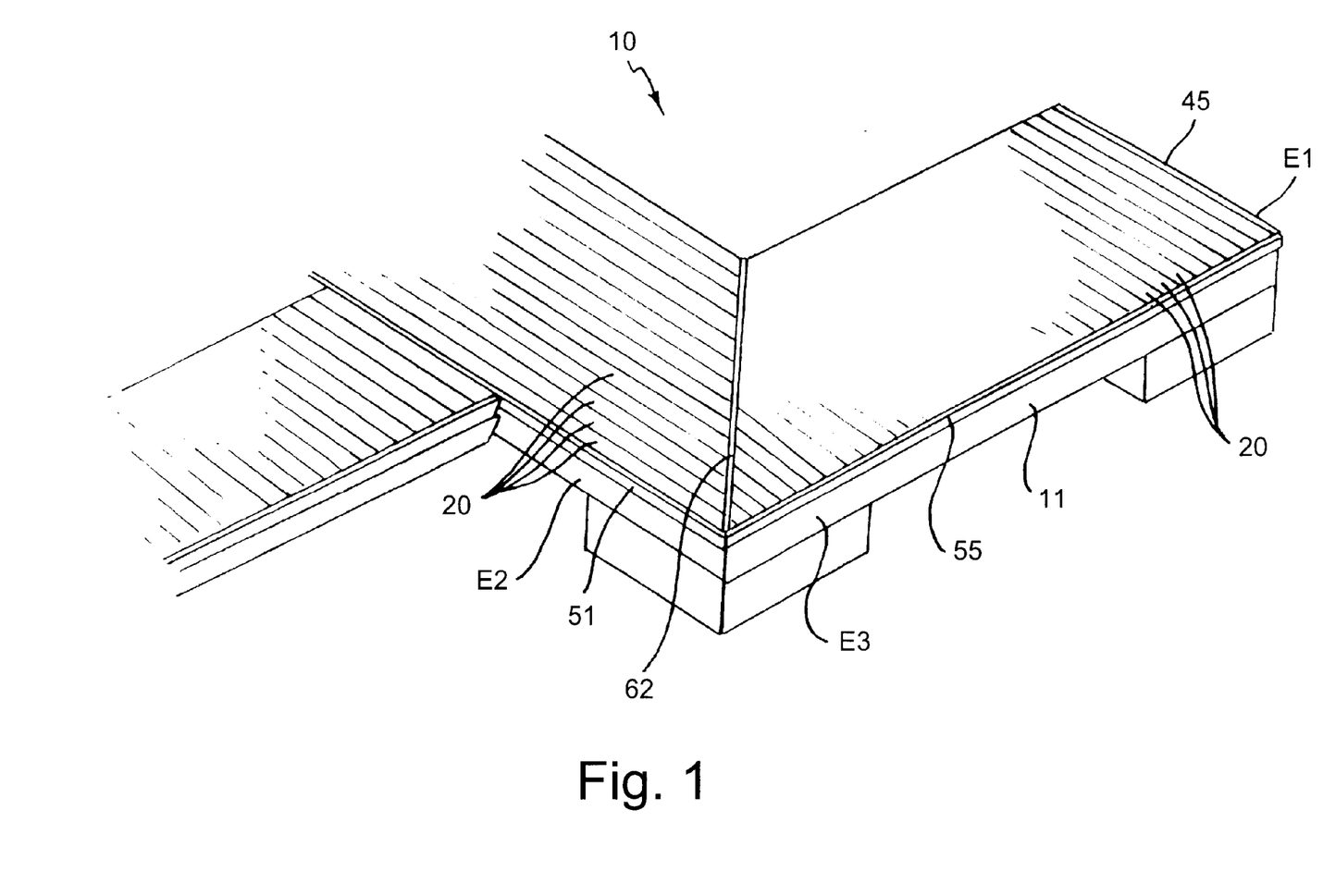
FIG. 1 is a fragmentary perspective view of a decking structure comprising an assembly of decking planks according to one embodiment of the invention.
Figure 2:
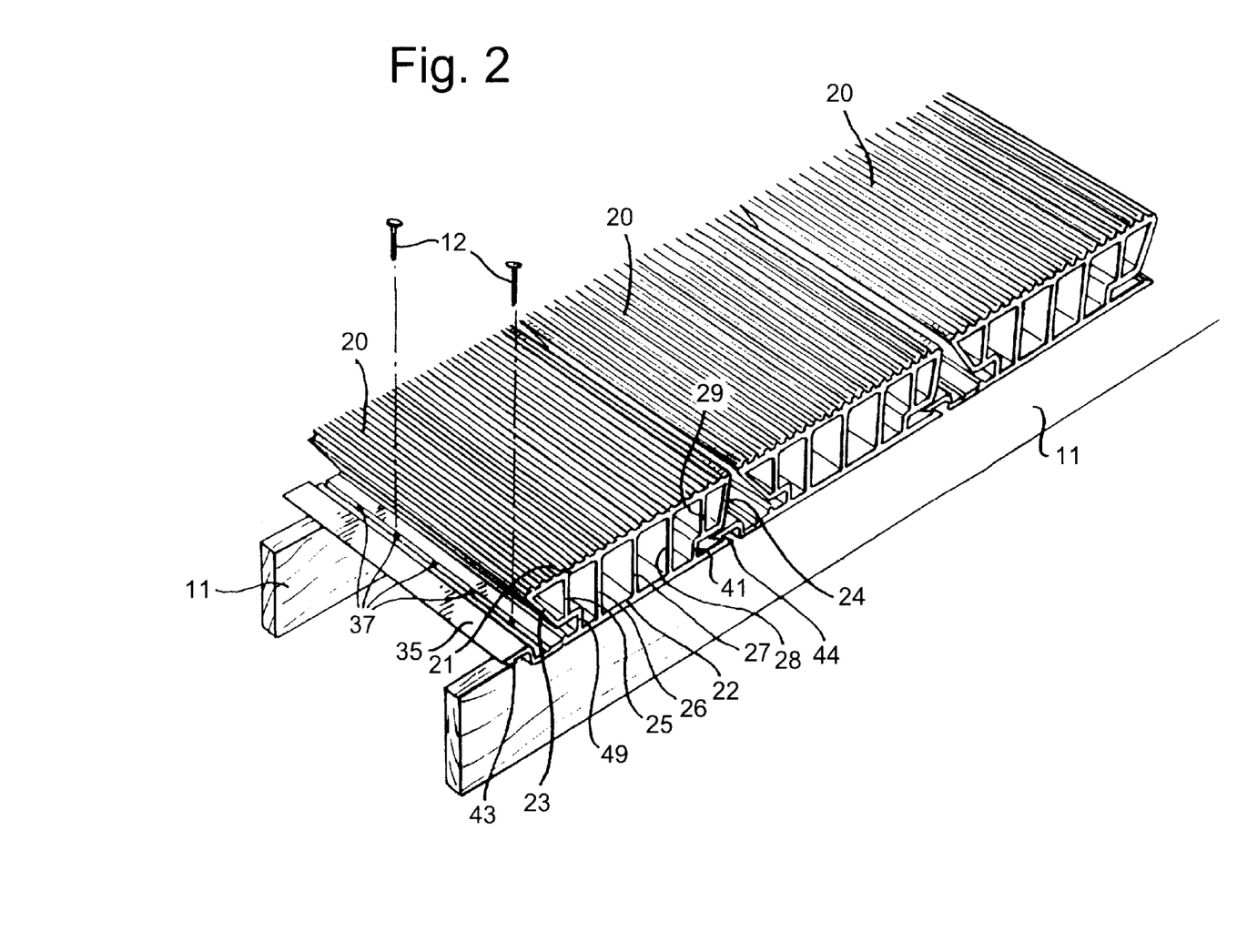
FIG. 2 is a fragment perspective view of a number of decking planks mounted on joists of a supporting subfloor, showing the connecting means for locking adjacent planks together.

Referring to the drawings, a decking structure according to the present invention is illustrated in FIG. 1 and shown generally at 10. The decking structure 10 is constructed of an assembly of one-piece modular construction elements in the form of decking planks 20 mounted on supporting joists 11 of a subfloor using wood screws 12, as shown in FIG. 2, or other suitable fasteners (not shown). The decking planks 20 are formed of an extruded high impact, UV stabilized polymeric material, such as PVC plastic, and are easily cut with a hand saw or electric circular saw to any desired length. According to the embodiment disclosed, the width of the decking plank 20 is 5.750 inches, and the height is 1.625 inches. The maximum space between adjacent planks is approximately 0.25 inches. Numerous other dimensions are possible within the scope of the invention. Moreover, while a boat dock is illustrated in FIG. 1, the invention has further application in construction of patio decks, piers, walkways, balconies, and the like.

Figure 3:
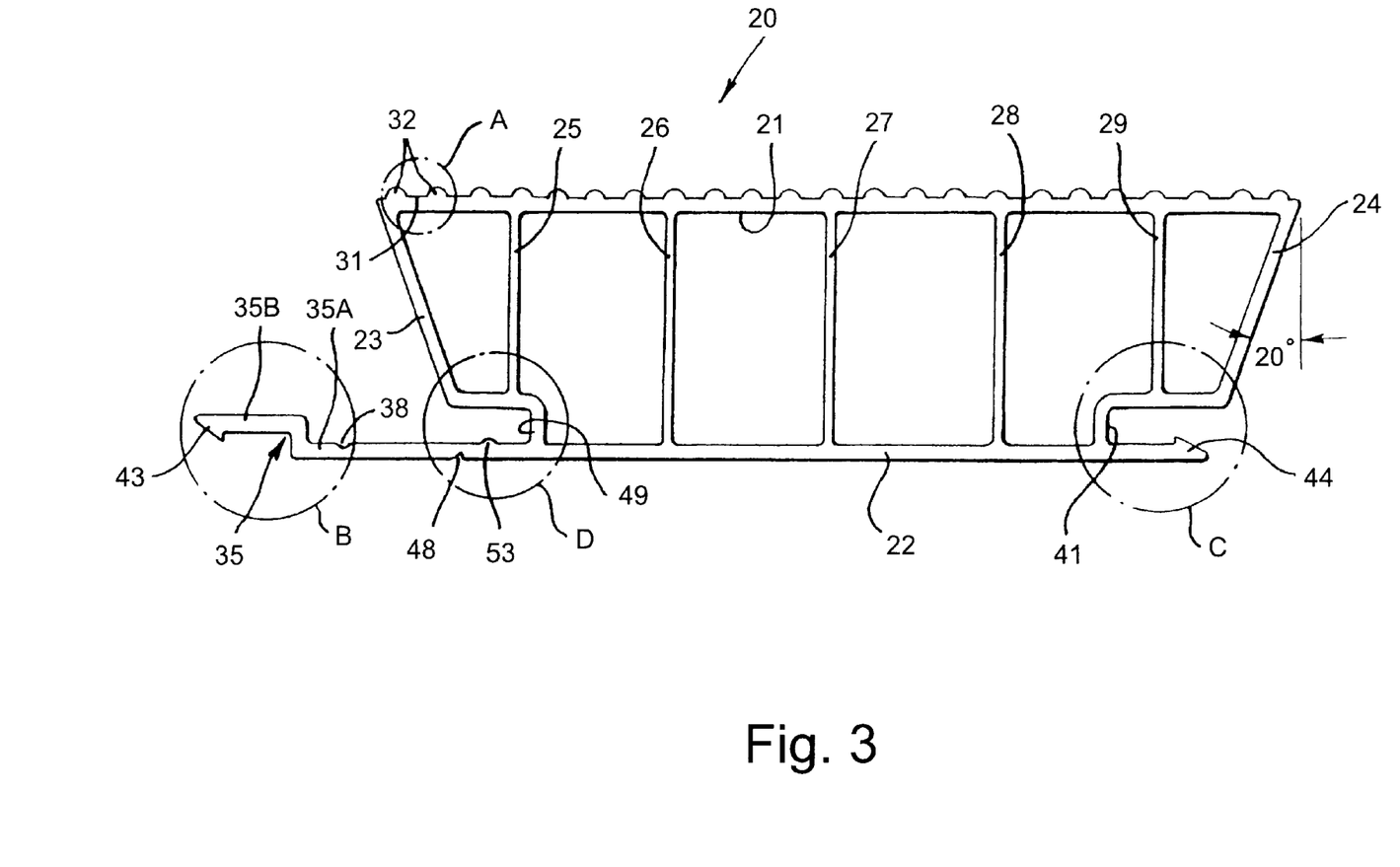
FIG. 3 is an end view of one of the decking planks shown in FIG. 2.

Referring to FIGS. 2 and 3, the decking plank 20 includes integrally-formed top and bottom walls 21 and 22, and opposing side walls 23 and 24. Integral reinforcing ribs 25, 26, 27, 28, and 29 are located between the side walls 23 and 24, and bridge the top and bottom walls 21 and 22. The ribs 25–29 extend longitudinally from one end of the decking plank 20 to the opposite end for increasing its load-resisting capacity. The side walls 23 and 24 converge towards the bottom wall 22 at an angle of about 20 degrees.

Figure 4:
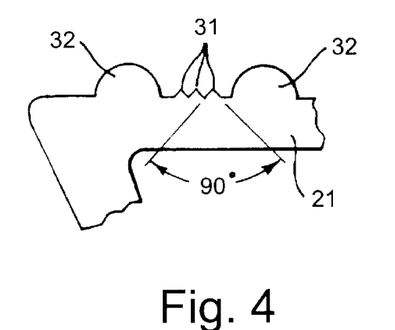
FIG. 4 is an enlarged view of the circled area 'A' in FIG. 3 showing a portion of the slip-resistant top surface of the decking plank.

A portion of the top wall 21 is illustrated in detail in FIG. 4. The top surface includes a number of alternately-spaced serrations 31 and risers 32 extending along the entire length of the decking plank 20, and laterally from one side edge of decking plank 20 to the other. In the illustrated embodiment, the serrations 31 extend 0.015 inches above the top surface of the decking plank 20, and are spaced approximately 0.030 inches apart from each other. The risers 32 extend 0.062 inches above the top surface, and are spaced approximately 0.25 inches apart. The rough texture provided by the serrations 31 and risers 32 creates a relatively slip resistant decking surface.

Figure 5:
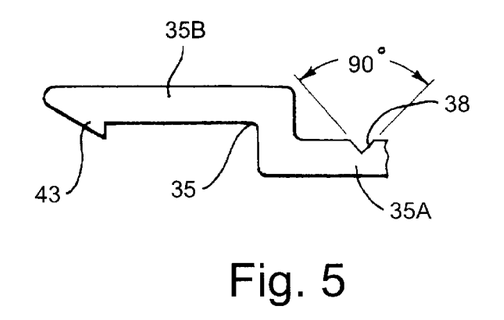
FIG. 5 is an enlarged view of the circled area 'B' in FIG. 3 showing an integrally-formed flange of the decking plank.
Figure 6:
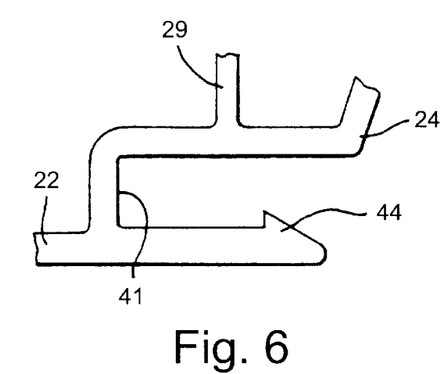
FIG. 6 is an enlarged view of the circled area 'C' in FIG. 3 showing an integrally-formed complementary channel of the decking plank.
Figure 7:
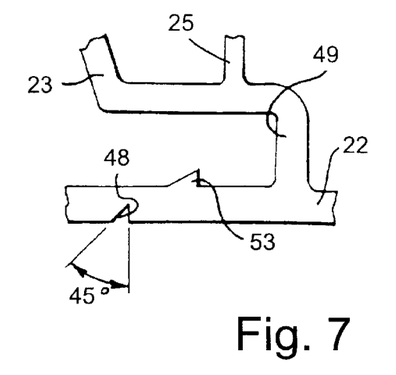
FIG. 7 is an enlarged view of the circled area 'D' in FIG. 3 showing an integrally-formed trim channel of the decking plank.

As shown in FIGS. 2, 3, and 5, an integrally-formed flange 35 extends outwardly from and along the bottom wall 22 on one side of the decking plank 20 along its entire length. The flange 35 includes a fastening portion 35A having a number of spaced openings 37 for receiving the wood screws 12 therethrough to the supporting joists 11, and for water drainage from a top surface of the decking structure 10. According to a preferred embodiment, the openings 37 are spaced 4.0 inches apart along the length of the flange 35 so that the planks 20 can be mounted to standard 16 inch center joists. The unused openings 37 between the joists 12 are thus available for drainage.

In a modification the preformed openings 37 may be omitted, a small longitudinally extending groove 38 being formed in the flange 35 to help guide the screws 12 through the flange 35 and into the joists 11 of the subfloor. Enhanced water drainage may be achieved by sloping the decking plank 20 slightly from one end to the other. This embodiment of the invention without openings 37 is especially applicable for use in overhead decking whereby an area below the decking is sheltered from rain water runoff.

Figure 13:
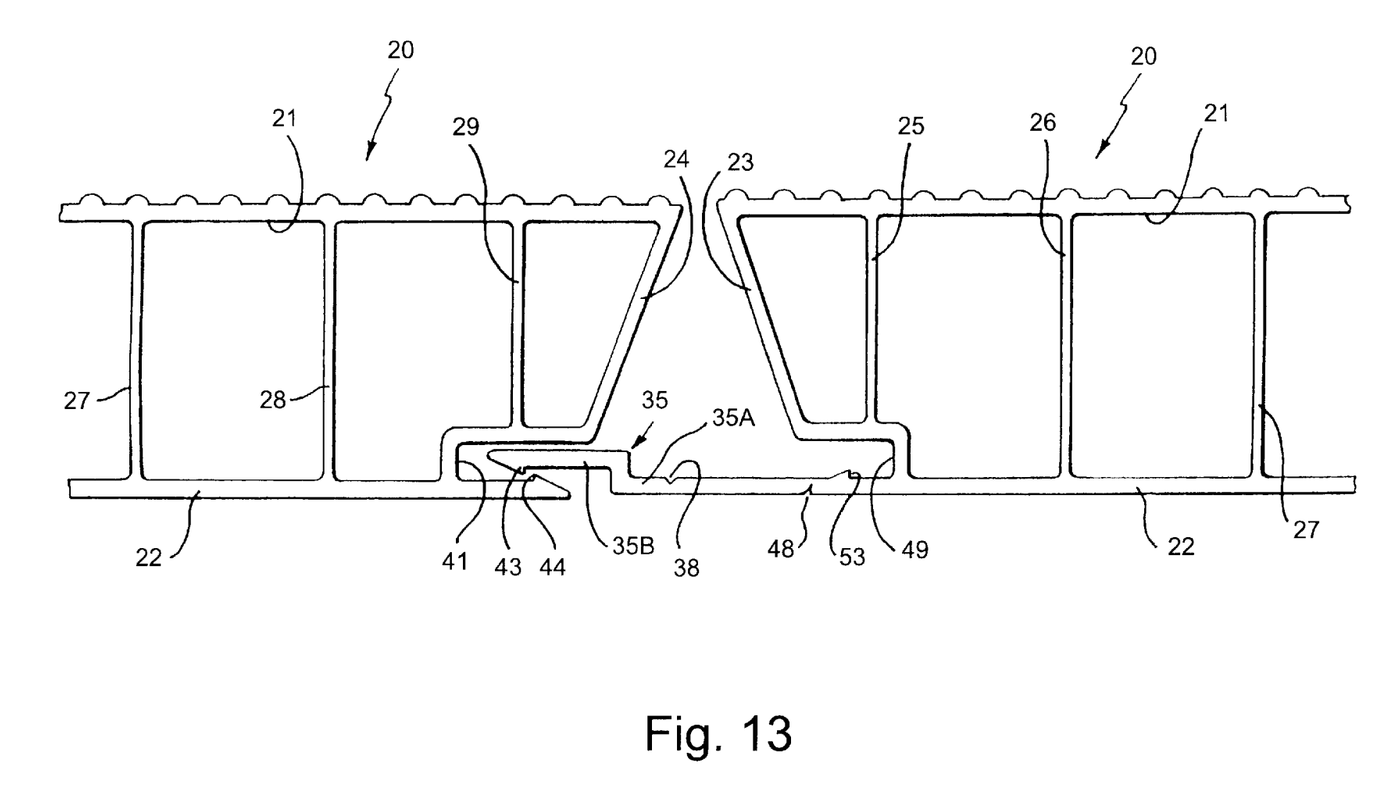
FIG. 13 is a cross-sectional view of two adjacent decking planks attached together.

A connecting portion 35B of the flange 35 is integrally formed with the fastening portion 35A, and provided for attaching the decking plank 20 to an adjacent like plank. The connecting portion 35B extends outwardly in a plane above the fastening portion 35A and engages with a fastening channel 41 of the adjacent plank 20, as is best shown in FIG. 13.

The channel 41 is integrally formed along the bottom wall 22 on the side of the decking plank 20 opposite the flange 35. The channel 41 extends longitudinally along the entire length of the decking plank 20, and cooperates with the connecting portion 35B of the flange 35 to space the adjacent planks 20 from each other and to attach the adjacent planks 20 together. The connecting portion 35B and channel 41 include interfering shoulders 43 and 44 providing a snap-attachment to lock the adjacent decking planks 20 to each other while permitting a limited degree of relative lateral movement between them.

The top walls of the adjacent planks may thus abut one another or be spaced apart to a limited variable extent. Spacing of the top walls creates series of longitudinal slots in the upper surface of the decking structure, through which surface water may drain into the generally triangular recesses defined by the sloping side walls 23 and 24 of the adjacent planks and the connecting members 35. These recesses form an unobstructed void extending from level of the top walls of the planks to the connecting means. The void may also serve to accommodate electrical or other cables to supply services at spaced locations along the assembled structure. Moreover by virtue of the relatively loose engagement between the connecting members 35 and 41, a limited degree of angular movement is permitted between adjacent planks to accommodate irregularities in level of the supporting joists 11.

Figure 9:
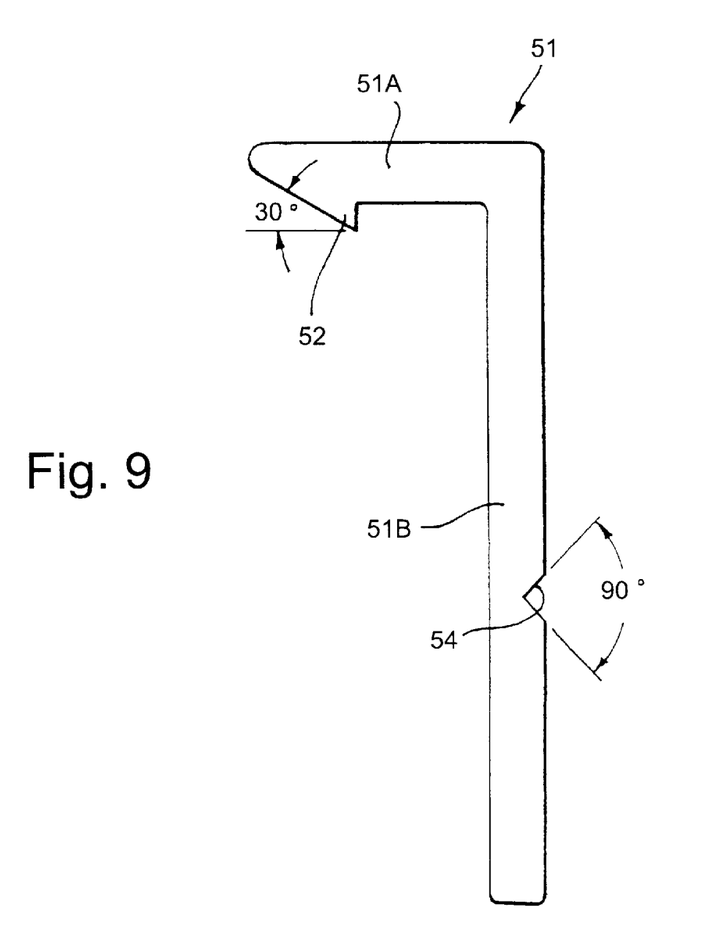
FIG. 9 is an end view of an elongate decking trim section for attachment to a longitudinal side of the decking plank.
Figure 14:
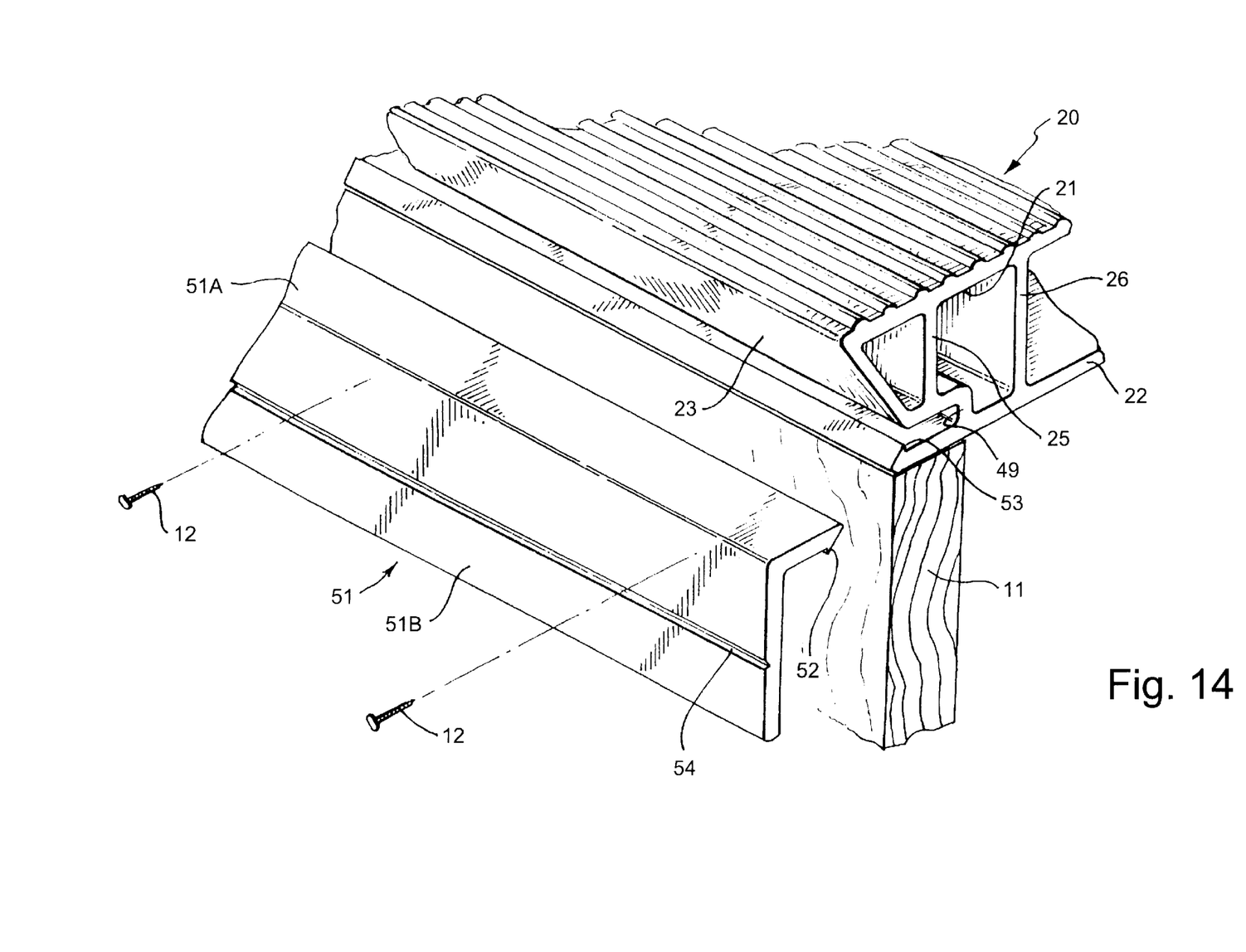
FIG. 14 is an enlarged fragmentary perspective view showing a decking trim according to FIG. 9 positioned for attachment to a decking plank adjacent an exposed side edge of the decking structure.

A second channel or recess 49 is formed in the side wall 23 adjacent to the bottom wall 22 for receiving a flange portion 51A of decking trim 51 shown in FIGS. 1, 9, and 14. The decking trim 51 is used to finish an exposed side edge of the decking structure 10, as described further below.

Figure 8:
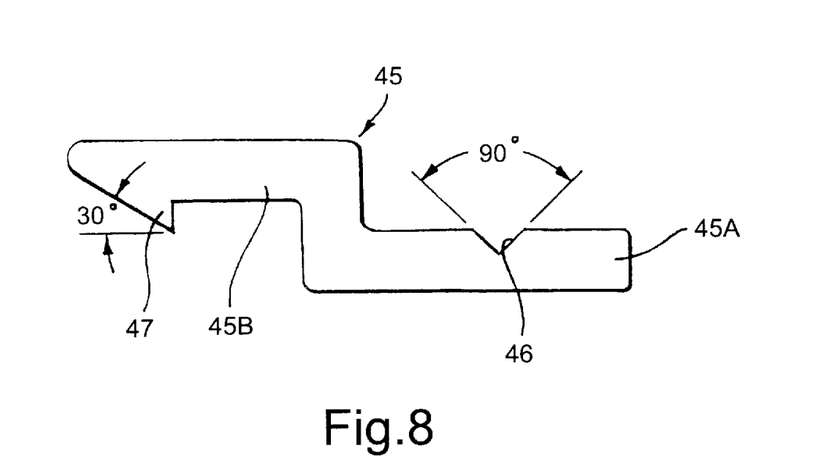
FIG. 8 is an end view of an elongate fastener strip used for initiating decking construction.
Figures 15, 16:
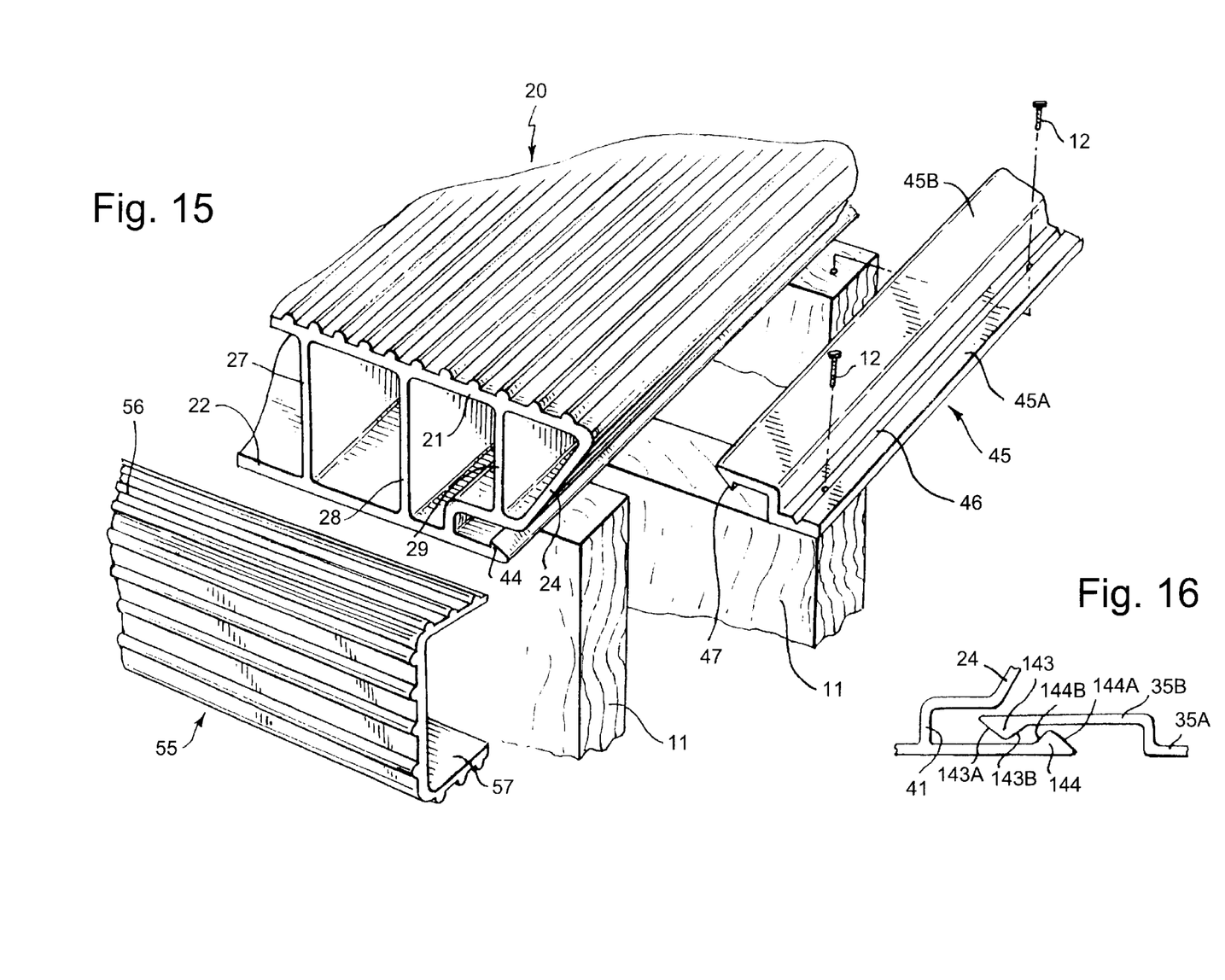
FIG. 15 is an enlarged fragmentary perspective view showing a flange according to FIG. 8 used for beginning decking construction, and a cap member according to FIG. 10 positioned for attachment to a decking plank.
FIG. 16 is an enlarged fragmentary view showing a modified form of connecting means.

To construct the decking, an elongate fastener strip 45, shown in FIGS. 1, 8, and 15, is first mounted on the supporting joists 11 at a side edge "E1" of the decking structure. A longitudinally extending groove 46 is formed in a mounting portion 45A of the strip 45 for guiding wood screws 12 or other fasteners therethrough to the joists 11. A first decking plank 20 is placed on the joists 11, and its fastening channel 41 snap-attached to a locking portion 45B of the fastener strip 45. A locking shoulder 47 is formed with the portion 45B, and cooperates with die shoulder 44 of the channel 41 to lock the decking plank 20 and fastener strip 45 together while permitting a limited degree of relative lateral movement between them Successive planks 20 are then snap-attached together by inserting the connecting portion of the flange 35 of one plank 20 into the channel 41 of an adjacent plank, as shown in FIG. 13. The planks 20 are secured one-by-one to the joists 11 by screws 12 as described above. The complementary connecting portions 35B and channels 41 of respective, adjacent planks 20 cooperate to space the planks 20 a predetermined distance from each other within the range of lateral adjustment permitted by the construction of these components. Separate spacers (not shown) may be used to achieve exact parallel spacing between adjacent planks.

Referring to FIGS. 1, 3, and 9, upon reaching a second side edge "E2" of the proposed decking structure, the flange 35 of the last fitted decking plank 20 is removed a saw at a groove 48 formed at the junction of the bottom wall 22 and the flange 35. The groove 48 preferably extends along the entire length of the decking plank 20 and forms a parting line, as described above. After removing the flange 35, a locking portion 51A of a decking trim 51 is inserted into the trim channel 49 at the side edge "E2" of the decking structure 10. As best shown in FIG. 14, the portion 51A and the channel 49 include interfering shoulders 52 and 53 for providing a convenient snap-attachment to lock the trim 51 and decking plank 20 together. A groove 54 is formed in the web 51B of the decking trim 51 for receiving screws 12 to secure the trim 51 directly to the adjacent supporting joist 11. If desired the joists 11 may be covered with an elongate plastic or vinyl cladding (not shown).

Figure 10:
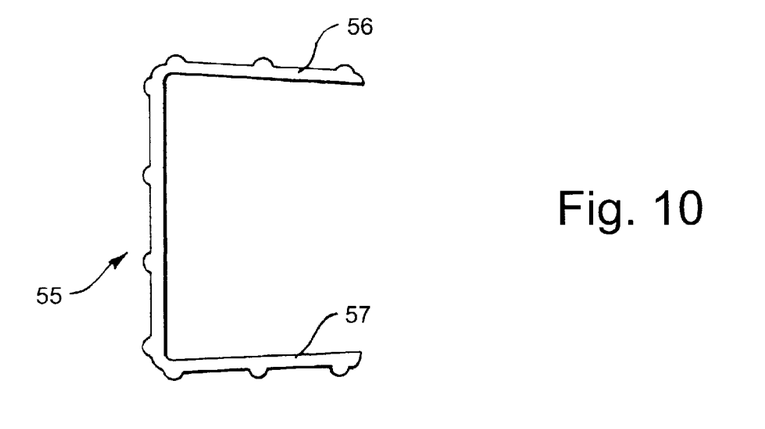
FIG. 10 is an end view of an elongate cap member for attachment to exposed ends of the decking planks.
Figure 11:
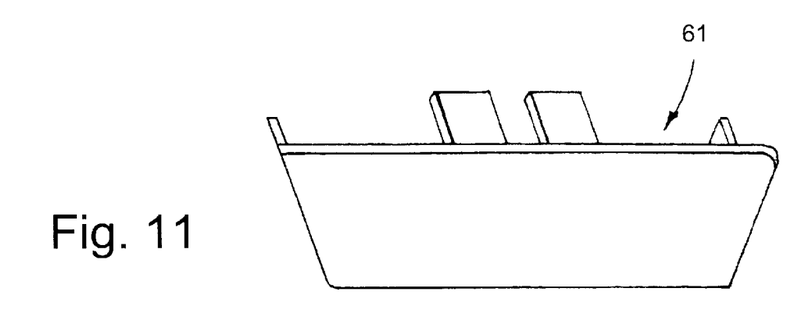
FIG. 11 is a perspective view of an alternative end cap for attachment to a distal end of a single decking plank.

Referring to FIGS. 1, 10, and 15, at an adjacent side edge "E3" of the decking structure 10, an elongate C-shaped cap 55 shown in FIGS. 10 and 15 may be applied to the exposed ends of the decking planks 20 to provide a more attractive and aesthetic side finish. The cap 55 includes spaced apart resilient arms 56 and 57 which slightly converge so that when they are spread and forced onto the exposed ends of planks 20, they frictionally engage the planks 20. One or more caps 55 may be used to finish the exposed side edge "E3". Alternatively, each plank 20 can be fitted with an end cover 61 such as shown in FIG. 11.

Figure 12:
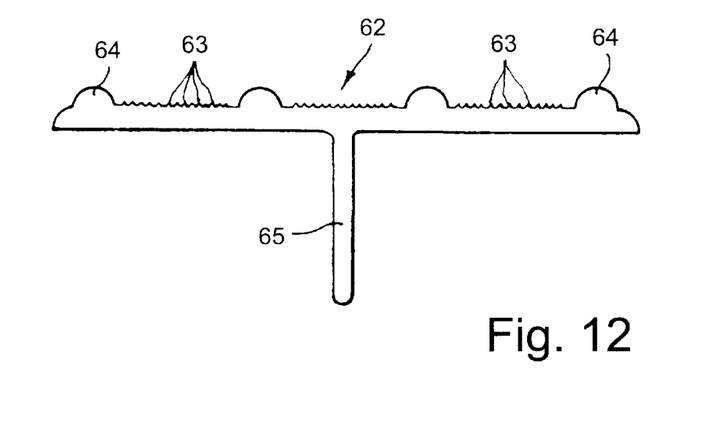
FIG. 12 is an end view of an elongate T-section for positioning adjacent to abutting ends of the decking planks.

In addition, as shown in FIGS. 1 and 12, an elongate cover trim 62 of T-section may be positioned at mitered, abutting ends of decking planks 20 to provide a uniform and aesthetic transition between the planks 20. The T-section trim 62 includes a textured top surface with alternately spaced serrations 63 and risers 64, and a center web 65 for locating between the abutting planks 20. The T-section trim 62 and end cap 55 may be further secured to the decking planks 20 with an adhesive or other suitable fastener if desired.

FIG. 16 shows a modified form of connecting means similar to that shown in FIG. 13 but in which the shoulders 143 and 144 have opposing sloping faces 143A, 143B and 144A, 144B. The sloping faces 143B and 144B replace the vertical abutting faces of the shoulders of FIG. 13 and facilitate disengagement of the connecting means and separation of adjacent planks if required. The cooperating shoulders on the trim components of FIGS. 8 and 9 and the shoulder 53 may also be modified in a similar manner.

Figure 17:
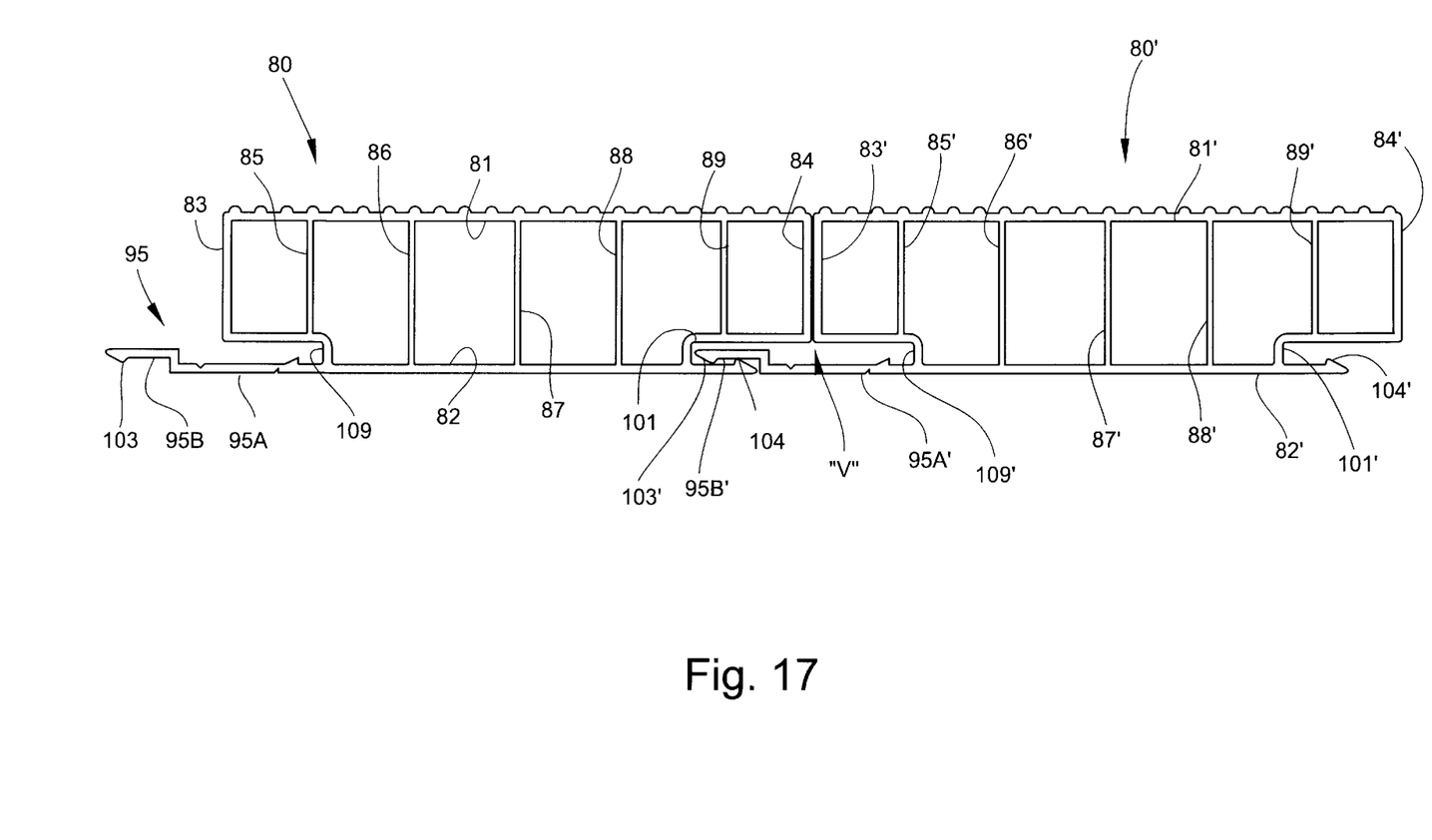
FIG. 17 is an end view of adjacent decking planks according to a further embodiment of the present invention with complementary fastening elements mated to closely space the top walls of the decking planks together.
Figure 18:
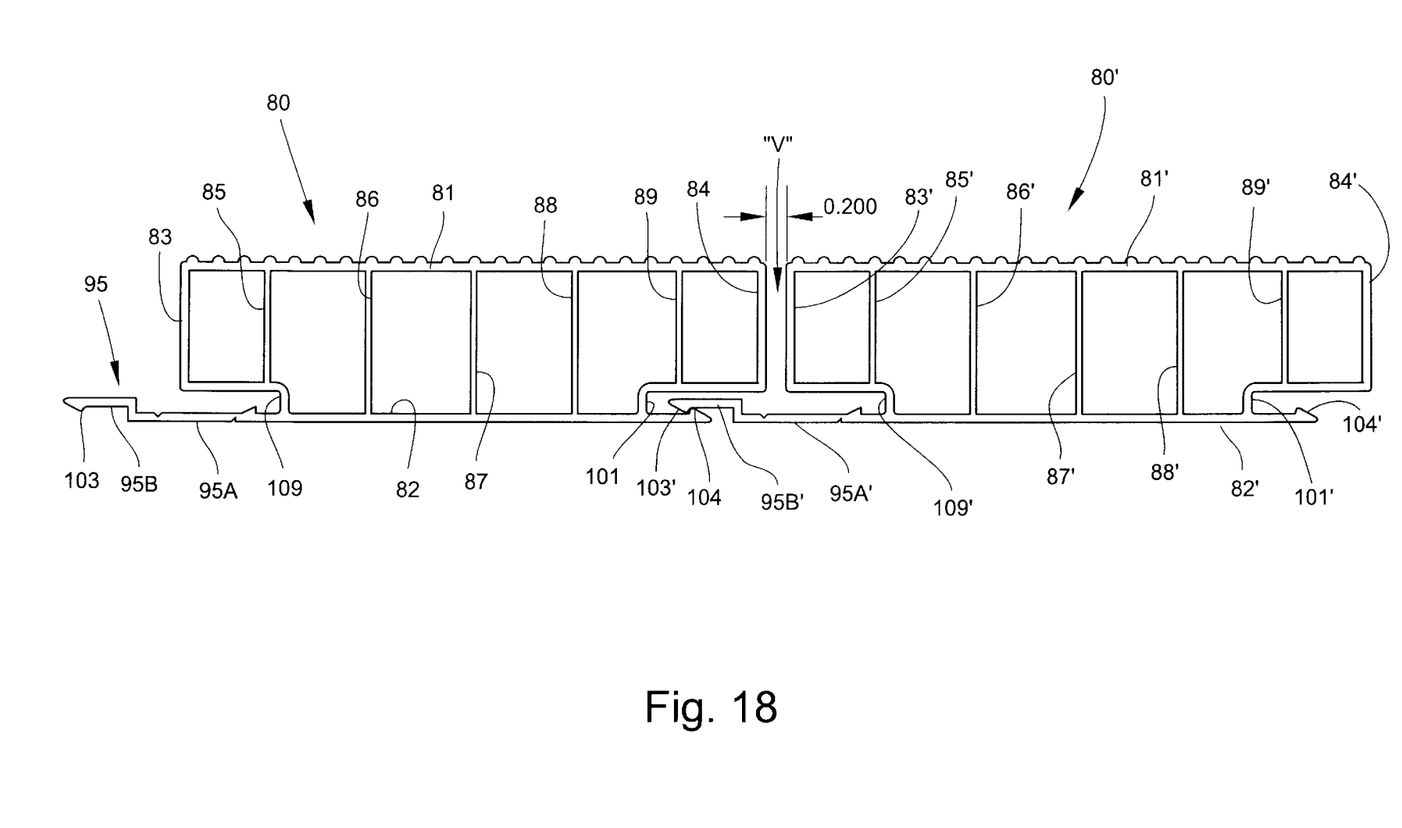
FIG. 18 is an end view of the decking planks illustrated in FIG. 17, and showing respective mating elements of decking planks arranged to laterally space the top walls of the decking planks apart from each other.

A decking plank 80 according to a further embodiment of the invention is shown in FIGS. 17 and 18. The decking plank 80 cooperates with an assembly of like planks, such as decking plank 80', to cover a supporting structure. Like elements forming the plank 80' are indicated in prime notation.

The decking plank 80 includes integrally-formed top and bottom walls 81 and 82, and opposing side walls 83 and 84. Integral reinforcing ribs 85, 86, 87, 88, and 89 are located between the side walls 83 and 84, and extend longitudinally from one end of the decking plank 80 to the other to bridge the top and bottom walls 81 and 82. The side walls 83 and 84 extend substantially perpendicularly downward from the top wall 81.

An integrally-formed fastener flange 95 extends outwardly from and along the bottom wall 82 on one side of the decking plank 80 along its entire length. The flange 95 includes a fastening portion 95A and an integrally-formed connecting portion 95B. The connecting portion 95B is provided for attaching the decking plank 80 to the adjacent plank 80'. A fastening channel 101 is integrally formed along the bottom wall 82 on the side of the decking plank 80 opposite the fastener flange 95, and extends longitudinally along the entire length of the decking plank 80. The fastening channel 101 cooperates with the connecting portion 95B' of the adjacent plank 80' to join the planks 80, 80', and to adjustably space respective top walls 81, 81' of the planks 80, 80' apart from each other. The channel 101 and connecting portion 95B' include respective interfering shoulders 104 and 103' which provide a snap-attachment to releasibly lock the adjacent decking planks 80, 80' together. A second channel or recess 109 is preferably formed in the side wall 83 adjacent to the bottom wall 82 for receiving a flange portion of decking trim, such as that shown in FIGS. 1, 9, and 14.

The interfering shoulders 104 and 103' permit a limited degree of relative lateral movement of the decking planks 80, 80' such that their respective top walls 81, 81' and adjacent side walls 84, 83' can reside closely spaced to each other or be variably spaced-apart. The resulting void "V" formed between the side walls 84 and 83' of the decking planks 80 and 80' is dependant upon the degree of insertion of the connecting portion 95B of the fastener flange 95 into the channel 101. When the connecting portion 95B is completely inserted, as shown in FIG. 17, the side walls 84 and 83' reside closely adjacent to each other thereby minimizing the extent of the void "V". When the connecting portion 95B is partially inserted, as shown in FIG. 18, the side walls 84 and 83' are farther spaced from each other. The maximum obtainable void "V" between the side walls 84, 83' is achieved in the arrangement shown in FIG. 18. Preferably, the void "V" extends without obstruction from the bottom wall 82, 82' towards the top walls 81, 81' of the decking planks 80, 80', and longitudinally from one end of the decking plak 80, 80' to the other.

The decking structure described above has numerous advantages over previously proposed wooden or plastic decking structures There are no exposed nails or other fasteners at the surface of the decking structure which require replacement, or could cause injury. The embossed top surface provides enhanced slipresistance and the integral construction of the individual planks avoids the need to engage interfitting components to form each plank. The manner of interconnection of the planks permits limited lateral adjustment between adjacent planks to accommodate to different overall widths of substructure and provides multiple drainage slots to dear water rapidly from the assembled structure.

It should be appreciated that while the invention is primarily intended for use in the construction of marine walkways and decking, plank elements according to the invention may also be used to construct cladding, screen fencing or other forms of structure.

An elongate modular construction element is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A decking structure comprising a plurality of interconnected decking planks each having spaced top and bottom walls interconnected by opposed side walls, first connecting means projecting outwardly beyond one side of a first decking plank and comprising a laterally projecting flange including a fastening portion for receiving fasteners therethrough for attaching the first decking plank to a supporting structure, and said flange including a connecting portion extending in a plane parallel to but offset from the plane of said fastening portion, second connecting means complimentary to said first connecting means formed at the opposite side of the first decking plank, each of said first and second connecting means being located adjacent the bottom wall of and extending continuously along the first decking plank from one end thereof to the other whereby the first decking plank is interconnected to a like second decking plank having corresponding first and second connecting means solely by engagement of said first connecting means of said first decking plank and said second connecting means of said second decking plank in side by side relation, with the top and side walls of the adjacent first and second decking planks spaced apart to define between the first and second decking planks a void extending without obstruction from the level of the top walls of the first and second decking planks to said engaged first and second connecting means, said engaged first and second connecting means serving to close off a bottom of said void and being adapted to permit limited sliding movement of the first and second decking adjacent planks relative to one another in a direction transverse to the length of the first and second decking planks and limited angular movement about an axis extending parallel to the length thereof.

2. A decking structure according to claim 1, wherein said second connecting means comprises a channel extending adjacent said bottom wall at the opposite side of the decking plank from said first connecting means for receiving the connecting portion of said flange.

3. A decking structure according to claim 2, including cooperable locking means on the connecting portion of said flange and on said channel whereby adjacent planks may be retained in connection with one another.

4. A decking structure according to claim 3, wherein each of said locking means comprises shoulders formed respectively on the connecting portion of said flange and within said channel.

5. A decking structure according to claim 1, including a longitudinally-extending groove formed in the fastening portion of said flange for guiding said fasteners therethrough to secure the plank to the supporting structure.

6. A decking structure according to claim 1, including a plurality of spaced-apart holes formed in said fastening portion of said flange for accommodating passage of fasteners therethrough to the supporting structure.

7. A decking structure according to claim 1, wherein said side walls of the plank extend substantially perpendicular to said top wall.

8. A decking structure according to claim 1, including a groove formed along the length of the fastening portion of said flange to enable removal of the flange from a plank positioned at an exposed edge of the assembled decking structure.

9. A decking structure according to claim 1, and including a further channel formed adjacent said first connecting means for receiving a trim member adapted to cloak the exposed edge of the assembled decking structure.

10. A decking structure according to claim 1, and including a plurality of reinforcing ribs located between said side walls and interconnecting said top and bottom walls.

11. A decking structure a plurality of interconnected modular construction elements according to claim 1 assembled together on a supporting structure.

12. A decking plank assembly for mounting on a supporting structure, comprising:

(a) a first decking plank comprising:
  i. a top wall, a bottom wall spaced-apart from said top wall, and opposed laterally-spaced side walls connecting said top and bottom walls together; and
  ii. an integrally-formed male fastening flange extending laterally outwardly from the bottom wall of said first decking plank;

(b) a second decking plank adjacent the first decking plank, and comprising:
  i. a top wall, a bottom wall spaced-apart from said top wall, and opposed laterally-spaced side walls connecting said top and bottom walls together; and
  ii. an integrally-formed female fastening channel extending laterally inwardly adjacent the bottom wall of said second decking plank, and adapted for receiving therein a portion of the male fastening flange of said first decking plank to join said first and second decking planks together; and (c) said male fastening flange of the first decking plank and said female fastening channel of the second decking plank cooperating upon insertion of said flange into said channel to adjustably space the top walls of said first and second decking planks, such that upon complete insertion of said flange into said channel, the top walls reside closely adjacent to each other, and upon partial insertion of said flange into said channel, the top walls reside a spaced-apart distance from each other;

(d) said first and second decking planks defining an adjustable void between respective adjacent side walls, said void extending without obstruction from the male fastening flange of the first decking plank towards the top walls of said first and second decking planks, and longitudinally from one end of the decking planks to the other, said void being adjustable laterally based on the degree of insertion of said male fastening flange of the first decking plank into said female fastening channel of the second decking plank; and (e) said male fastening flange and said female fastening channel including respective interfering shoulders cooperating to releasibly lock the first and second decking planks together.

* * * * *

UNITED STATES PATENT AND TRADEMARK OFFICE
CERTIFICATE OF CORRECTION

PATENT NO. : 6,199,340 B1
DATED : March 13, 2001
INVENTOR(S) : Davis, Harry H.

It is certified that error appears in the above-identified patent and that said Letters Patent is hereby corrected as shown below:

Claim 11,
Should read as follows:
A decking structure <u>comprising</u> a plurality of interconnected modular construction elements according to claim 1 assembled together on a supporting structure.

Signed and Sealed this

Thirtieth Day of October, 2001

*Attest:*

*Nicholas P. Godici*

*Attesting Officer*

NICHOLAS P. GODICI
*Acting Director of the United States Patent and Trademark Office*